United States Patent [19]

Bambara et al.

[11] Patent Number: 5,350,544
[45] Date of Patent: Sep. 27, 1994

[54] METHOD OF PREPARING A CROSS-LINKED, POLYETHYLENE FOAM PRODUCT BY SURFACE EXPANSION OF A FOAM

[75] Inventors: John D. Bambara, Osterville; Jon A. Glydon, West Barnstable, both of Mass.

[73] Assignee: Earth & Ocean Sports, Inc., Hyannis, Mass.

[21] Appl. No.: 79,167

[22] Filed: Jun. 18, 1993

Related U.S. Application Data

[63] Continuation of Ser. No. 847,318, Mar. 6, 1992, abandoned.

[51] Int. Cl.⁵ .................................................. B29C 67/22
[52] U.S. Cl. ........................................ 264/25; 264/48; 264/138; 264/293; 264/321
[58] Field of Search ................ 264/48, 293, 145, 55, 264/321, 138, 25

[56] References Cited

U.S. PATENT DOCUMENTS

| | | | |
|---|---|---|---|
| 3,207,646 | 9/1965 | Hacklander | 264/48 |
| 3,812,225 | 5/1974 | Hosoda et al. | 264/321 |
| 3,857,915 | 12/1974 | Crowley | 264/48 |
| 4,091,154 | 5/1978 | Hirai | 264/321 |
| 4,399,086 | 8/1983 | Walter | 264/321 |
| 4,740,258 | 4/1988 | Breitscheidel | 264/321 |

*Primary Examiner*—Allan R. Kuhns
*Attorney, Agent, or Firm*—Richard P. Crowley

[57] ABSTRACT

A method for the preparation of a cross-linked, rigid, polyethylene, foam sheet product, which method comprises heating at least one surface of a cross-linked, polyethylene, foam sheet material, to a temperature sufficient to cause a slight surface post-expansion of the foam sheet material, contacting the heated, post-expanded, foam surface with a cold metal element, to form a cross-linked, polyethylene, foam sheet product of the desired, accurate thickness, or having a desired three-dimensional design on the cross-linked, foam sheet material.

11 Claims, 1 Drawing Sheet

METHOD OF PREPARING A CROSS-LINKED, POLYETHYLENE FOAM PRODUCT BY SURFACE EXPANSION OF A FOAM

This is a continuation of copending application Ser. No. 07/847,318 filed on Mar. 6, 1992, now abandoned.

BACKGROUND OF THE INVENTION

Thermoplastic, rigid foam materials, such as rigid, closed-cell, polyethylene foam materials, are employed, in sheet or board form, for a variety of uses. The foam material may vary in thickness, for example, from 2 to 6 inches for body boards or surf boards, and also may be employed at lower thicknesses; for example, $\frac{1}{8}$th to $\frac{1}{2}$ of an inch for foot treads. The polyethylene foam material may be heat-embossed, using a hot die, with various heat designs.

A polyethylene, foam sheet material also is commercially provided as a cross-linked, rigid, polyethylene, foam sheet material, wherein the polyethylene may be cross-linked, such as by irradiation or the use of organic cross-linking agents, such as organic peroxides, and wherein a foam material may be formed, such as by the employment of chemical blowing agents. Typically, a cross-linked, polyethylene foam sheet material is provided by admixing a selected amount of a blowing agent into polyethylene material in an extruder, so that cross-linking of the polyethylene, foam sheet material occurs on heating. Thereafter, the matrix material is conveyed through a long oven and expanded into a generally flat, cross-linked, polyethylene, foam bun or sheet material. However, in such a method of preparing cross-linked, polyethylene, foam sheet materials, the resulting foam sheet material is not characterized by good control of foam thickness, since the foam is expanded in a long, hot oven, so that the foam sheet product typically varies in thickness; for example, with a $\frac{1}{2}$-inch-type sheet material, the thickness may vary by 5% up to 20%. In addition, the cross-linked, polyethylene, foam sheet materials or resulting products cannot be heat-embossed with a heated die, as with noncross-linked, polyethylene foam materials, particularly when the degree of cross-linking is higher, such as greater than 10%; for example, 40% to 90%.

It is desirable to provide for a new and unique method for preparing cross-linked, polyethylene, foam sheet products, such as a foam sheet material of controlled and accurate thickness, and to prepare cross-linked foam products having accurate, three-dimensional designs thereon, and to the product so produced.

SUMMARY OF THE INVENTION

The invention relates to a method for preparing a cross-linked, thermoplastic, foam sheet product and to the product so prepared. In particular, the method relates to the preparation of a cross-linked, polyethylene, foam sheet material of controlled thickness, and to the foam sheet material having a controlled, embossed surface thereon.

The invention comprises a method for preparing a cross-linked, olefinic, foam sheet material, more particularly a cross-linked, polyethylene or polypropylene, foam sheet material, and which method comprises: providing a cross-linked, olefinic material, like a polyethylene or polypropylene, foam sheet material, such as greater than 10% cross-linked material; for example, 40% to 90%, which sheet material may vary in thickness; and heating at least one surface of the sheet material to a temperature sufficient to cause a surface post-expansion of the foam in the heated area of the foam sheet material, such as, for example, but not limited to, about $\frac{1}{8}$th to $\frac{1}{4}$th or more of an inch in thickness expansion, and typically at a heating temperature of greater than 250° F; for example, 300° F. to 450° F., such as 275° F. to 400° F. The method includes contacting the heated surface or surface area of the cross-linked, foam sheet material with a cold-metal element, such as cold-metal rollers or cold-metal die or mold-embossing elements, to form a cross-linked, foam sheet material of the desired, controlled, thickness dimensions or embossed configuration.

In particular, it is desirable, for example, in one embodiment of the invention, to heat both surfaces of a cross-linked, polyethylene, foam-sheet, board-type material, to effect a slight surface post-expansion on both sides of the foam-board stock, and, thereafter, passing the heated surface of the board stock through one or more pairs of opposing, cold, metal rollers, whereby the metal rollers cause a slight reduction to a desired, controlled thickness of the board stock; thus, resulting in a cross-linked, polyethylene, foam sheet material of a controlled and defined thickness, and avoiding the difficulties in further processing with board-stock material that has undefined or uncontrolled sheet thickness.

In another embodiment of the invention, it is desirable to provide for heating a particular surface area of the cross-linked, foam sheet material to a temperature sufficient to cause a slight surface post-expansion of the foam sheet material, and, thereafter, applying a cold die or mold element, male or female, with a desired design or embossing thereon, or letters, trademarks or other three-dimensional designs or indicia thereon, to the heated surface area of the cross-linked, polyethylene, foam sheet material. The cold die; for example, at a temperature of 60° F. to 80° F. and which in production may require chilling, to maintain a proper cold-die temperature of less 100° F., provides for the slight foam expansion into the various cavities of the female, cold die element, to form the desired three-dimensional design or configuration on the surface of the cross-linked, polyethylene, foam sheet material. For example, the employment of a cold die element against a particular heated area of the cross-linked, polyethylene, foam sheet material, may be employed, to mark the sheet material with model numbers, a trademark or the product name, and, more particularly, to form a design on the surface, such as a footwear-tread or other design, which subsequently may be cut from the cross-linked, foam sheet material and subsequently used in the preparation of footwear, or for other similar, three-dimensional, design purposes.

Thus, the method of the invention provides for providing a decoration, for example, on a surf or body board, by heating the particular area of the surf or body board, to heat the foam surface, and then to press a cold mold or die into it, to take the shape of the particular decoration in the cold mold or die. The method is important, because it enables changes in the properties of the foam surface, by preheating the foam surface, and then, for example, running the foam, board-stock material through cold rollers, which enables the resulting foam sheet material or foam board stock to be produced at a controlled thickness, and even to reestablish an even thickness throughout the foam board stock, and to relieve stresses in the board-Stock material, and by expanding the foam surface, to reduce the density of the foam on the surface, by heating on both sides and contacting with the cold rollers or molds. The slight post-expansion of the foam material, and subsequent cold-element contacting, provide a higher-density, foam skin layer on the contacted areas.

The heating of the surface of the cross-linked, foam sheet material may be accomplished in numerous ways, and more particularly, for example, by the impingement of hot air from hot-air blowers on one or both surfaces or areas, or by the employment infrared heaters directed against the surface or particular areas of one or both surfaces.

The method of the invention, therefore, relies on the slight, heated post-expansion of the rigid foam surface of the cross-linked, thermoplastic, foam sheet or board-stock material, in order to control the thickness thereof, or to impart a design or decoration on the heated surface. Typically, in the prior art, polyethylene, foam, sheet-type products, such as body boards or surf boards, have been prepared, with a trademark or functional design thereon, by pressing a hot mold or die into the surface of the noncross-linked, thermoplastic, polyethylene, foam sheet material, to form the desired mark or design thereon. However, this technique is not suitable and cannot be used, in connection with cross-linked, rigid, thermoplastic, foam sheet materials. With cross-linked, rigid, foam sheet materials, such as rigid, closed-cell, cross-linked, polyethylene, foam sheet materials, the present practice has been to thermoform various levels on a given, cross-linked, foam sheet product, by placing that part of the product into a mold and gradually heating the mold, and allowing the cross-linkable, polyethylene, foam material to expand inside to mold, and, thus, to form the part of the design in the mold by the molding technique. However, as described and illustrated by the invention, it has been found, surprisingly, that, by heating the surface of the cross-linked, foam sheet material and, thereafter, applying cold rollers or a cold die, the thickness of the material may be reduced slightly or controlled, as desired, and the surface theremoformed as desired, by employing the cold dies; thus, providing for a simple and inexpensive technique suitable for use with cross-linked, thermoplastic foam materials.

The method of the invention may be employed in connection with various thermoplastic, cross-linked, foam materials, but more particularly relates to a cross-linked, polyethylene or polypropylene, or other olefinic resin polymer and copolymer, foam sheet material, which is generally commercially available as board stock or sheet material, which ranges in thickness, and particularly is substantially a rigid, closed-cell-type foam material, which has a foam density ranging from about 2 to 22 pounds per cubic foot, and more typically a range of 4 to 16 pounds per cubic foot, and which is generally prepared by forming at temperatures of from about 200° F. to 250° F. or more. Generally the amount of cross-linking of the olefinic polymer may vary, but generally ranges from greater than 10% cross-linked material; for example, 40% to 90%.

The invention will be described for the purposes of illustration only, in connection with certain embodiments; however, it is recognized that those persons skilled in the art may make various changes, modifications, additions and improvements to the illustrated embodiments, without departing from the spirit and scope of the invention.

DESCRIPTION OF THE EMBODIMENTS

Figure 1:
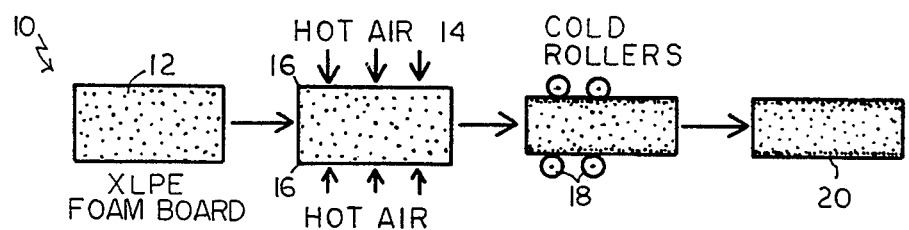
FIG. 1 is a schematic illustration of a method for preparing a cross-linked, polyethylene, foam product of controlled thickness.

FIG. 1 shows a method 10 for preparing a cross-linked, polyethylene, foam, board-stock product of controlled thickness, wherein a cross-linked, rigid, polyethylene, foam board 12, having a density, for example, of 4 to 12 pounds per cubic foot, and having a thickness of about 3 inches, is commercially provided. The entire surface 16 of the foam board 12 is heated, employing hot air from a hot-air blower 14, directed to both surfaces of the foam board stock 12, to cause a slight post-expansion rise of the foam on the foam surface 16 greater than the variation in foam-board-stock thickness. The board stock 12, with the heated surfaces 16, is passed through one or more pairs of opposing, accurately spaced-apart, cold metal rollers 18, in order to provide for a controlled-size, foam board stock 20, having a controlled thickness caused by reduction of the post-expansion foam on surfaces 16; thus, providing a board stock wherein the thickness is accurate; for example, to less than 0.050 inches, rather than the commercially supplied board stock 12, wherein the thickness varies, due to its method of preparation. The foam board stock, on foam reduction, has a higher-density, foam skin layer, due to such controlled-thickness reduction by the rollers.

Figure 2:
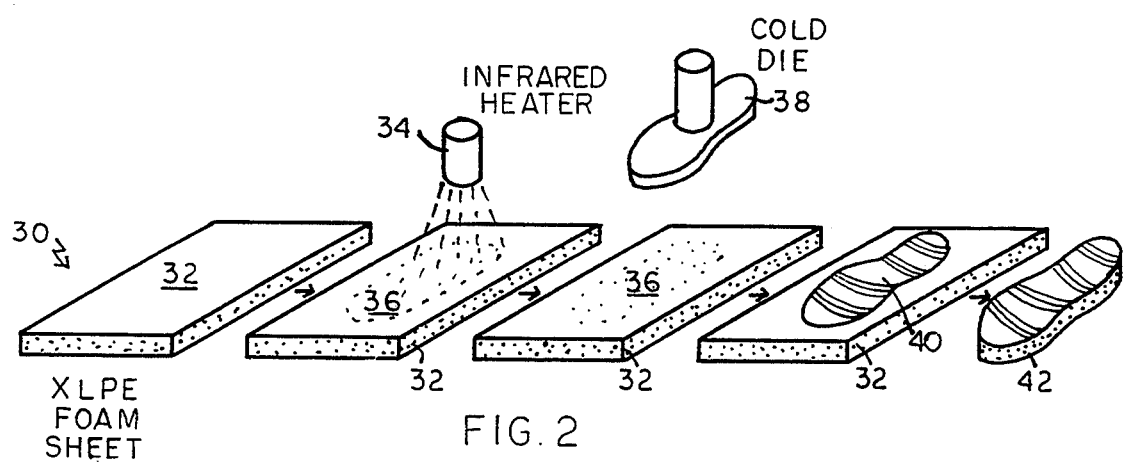
FIG. 2: is a method of preparing an embossed, cross-linked, polyethylene, foam product, particularly a footwear-tread product.

FIG. 2 is directed to a method of preparing a cross-linked, rigid, polyethylene, foam product having a three-dimensional surface design thereon, and particularly to a footwear-tread product. The method 30 comprises providing a commercial, cross-linked, rigid, closed-cell, polyethylene, foam sheet 32 (XLPE); for example, a ¼th-inch foam sheet, having a foam density of about 6 to 12 pounds per cubic foot. The foam sheet 32 is then heated by an infrared heater 34 on one surface, to form a generally oval, heated surface area 36 on the foam sheet 32, to cause a slight foam post-expansion rise on the heated surface 36. A cold metal die 38, bearing the desired design, in this particular illustrative case, the design of a full foot tread, is positioned above the heated area 36, and pressed against therein, to provide for the formation of a foam sheet product 32 having a three-dimensional, foam-tread-wear surface 40. The heating of the surface 36 causes a slight post-expansion of the foam cells on the foam board stock 32, and which foam cells rise to fill in the cavities of the cold die 38 and to form, on cooling, the three-dimensional, foam tread design. The foam tread is cut from the board stock 32; for example, by die-cutting; thus, providing for a cross-linked, polyethylene-foam-density, tread product 42.

The method of the invention provides for producing a controlled-thickness, cross-linked, thermoplastic, foam board stock with relieved stresses, and having a thin skin layer of a higher foam density than the core of the foam stock board, and also provides for a three-dimensional, embossed, cross-linked, thermoplastic, foam product, wherein an embossed design is placed on the product, the design having a higher density than the rest of the foam sheet material, such as in the production of a foot-tread product useful in the preparation of footwear.

What is claimed, is:

1. A method for the preparation of a controlled thickness, crosslinked, thermoplastic, foam sheet product, which method comprises:
   a) providing a pre-formed cross-linked, rigid, thermoplastic, olefinic, foam sheet material of varied thickness, cross-linked in an amount greater than about ten percent and containing residual blowing agents therein, the foam sheet material capable of further surface expansion;
   b) surface heating only at least one surface of the rigid, cross-linked, thermoplastic, foam sheet material to a temperature greater than about 250° F. and sufficient to cause slight surface foam expansion of the foam surface of the foam sheet material, said surface foam expansion being not greater than about ¼ inch;
   c) contacting the heated, post-expanded foam surface of the cross-linked foam sheet material with a cold element to form a foam sheet material of desired, controlled thickness dimensions with a thin, densified skin layer; and
   d) recovering the controlled thickness dimension foam sheet product.

2. The method of claim 1 wherein the cross-linked, thermoplastic, foam sheet material comprises a cross-linked polyethylene or polypropylene foam sheet material having a foam density ranging from about 2 to 22 pounds per cubic foot.

3. The method of claim 1 which includes heating the surface of the cross-linked foam sheet material employing a hot-air or an infrared heat directed to said surface.

4. The method of claim 1 which includes heating the cross-linked foam sheet surface to a temperature of about 250° F. to 450° F.

5. The method of claim 1 which includes heating the entire surface of both surfaces of the foam sheet material and contacting each heated surface with spaced apart, cold rollers to reduce the thickness dimensions of the cross-linked, thermoplastic foam sheet material to a desired, controlled thickness and with the resulting foam product having opposing skin layers of higher density foam than the original thermoplastic foam sheet material.

6. The method of claim 1 which includes heating only a selected area of the cross-linked, thermoplastic foam sheet material, and thereafter, contacting the heated, cross-linked area with a cold metal element having a design therein, to form a three dimensional, embossed design on the heated, embossed surface.

7. The method of claim 1 wherein the cross-linked foam sheet material comprises a foam sheet, board stock material having a thickness ranging from about ¼ of an inch to 6 inches.

8. The method of claim 8 which includes cutting out the embossed design from the foam sheet material and recovering the embossed foam sheet product.

9. The method of claim 6 which includes embossing a design onto one surface of the foam sheet material, and thereafter, die cutting the embossed design from the foam sheet material.

10. The method of claim 1, wherein the thermoplastic foam sheet material is cross-linked to about 40% to 90% to form a semirigid or rigid foam sheet material.

11. A method for the preparation of an accurately dimensioned, cross-linked, polyethylene, rigid foam sheet material adapted for use in the production of body boards and surf boards, which method comprises:
   a) providing a preformed, cross-linked, rigid, polyethylene foam sheet material of varied thickness containing residual blowing agents therein, the sheet material capable of further expansion and cross-linked in the amount of about 40% to 90% and having a foam density of about 4 to 16 pounds per cubic foot;
   b) heating both surfaces of the foam sheet material to a temperature of about 250° F. to 450° F. by the impingement onto the surface of hot air or infrared heat to cause a slight surface foam expansion of the foam sheet material, said surface foam expansion being not greater than about ¼ inch.
   c) passing the surface-heated foam sheet material through a pair of spaced apart, cold rollers having a temperature of less than about 100° F. to form a foam sheet material of desired, controlled thickness with a thin, densified, polyethylene skin layer on both surfaces; and
   d) recovering the controlled thickness foam sheet material.

* * * * *

UNITED STATES PATENT AND TRADEMARK OFFICE
CERTIFICATE OF CORRECTION

PATENT NO. : 5,350,544
DATED : September 27, 1994
INVENTOR(S) : John D. Bambara et al It is certified that error appears in the above-indentified patent and that said Letters Patent is hereby corrected as shown below:

Column 6, line 11, delete "claim 8" and insert --claim 6--.

Signed and Sealed this

Twenty-ninth Day of November, 1994

Attest:

BRUCE LEHMAN

Attesting Officer     Commissioner of Patents and Trademarks